United States Patent [19]

Wade

[11] Patent Number: 6,048,955
[45] Date of Patent: Apr. 11, 2000

[54] MODACRYLIC COPOLYMER COMPOSITION

[75] Inventor: Bruce E. Wade, Decatur, Ala.

[73] Assignee: Solutia Inc., St. Louis, Mo.

[21] Appl. No.: 09/243,857

[22] Filed: Feb. 2, 1999

[51] Int. Cl.$^7$ .......................... C08F 220/44; C08F 220/46
[52] U.S. Cl. .......................... 526/342; 526/287; 526/330; 526/343
[58] Field of Search .................................. 526/342, 330, 526/343, 287

[56] References Cited

U.S. PATENT DOCUMENTS

| | | | |
|---|---|---|---|
| 2,763,631 | 9/1956 | Coover, Jr. et al. | 260/45.5 |
| 2,769,793 | 11/1956 | Ham | 260/32.6 |
| 3,088,188 | 5/1963 | Knudsen | 28/82 |
| 3,193,603 | 7/1965 | Rowe et al. | 264/182 |
| 3,253,880 | 5/1966 | Lawson et al. | 8/115.5 |
| 3,402,235 | 9/1968 | Henderson et al. | 264/182 |
| 3,426,104 | 2/1969 | Masson | 260/895 |
| 3,507,823 | 4/1970 | Trapasso et al. | 26/32.6 |
| 3,824,222 | 7/1974 | Shichijo et al. | 260/80.71 |
| 3,828,014 | 8/1974 | Wieden et al. | 260/85.5 |
| 3,867,499 | 2/1975 | Morgan | 264/182 |
| 3,870,590 | 3/1975 | Hurwitz | 161/92 |
| 3,932,577 | 1/1976 | Palethorpe et al. | 264/182 |
| 3,974,130 | 8/1976 | Hurm | 260/79.3 |
| 4,067,948 | 1/1978 | Reinehr et al. | 264/182 |
| 4,243,390 | 1/1981 | Schäfer et al. | 8/553 |
| 4,294,884 | 10/1981 | Hartwig et al. | 428/364 |
| 4,447,384 | 5/1984 | Tamura et al. | 264/206 |
| 4,513,126 | 4/1985 | Yamazaki et al. | 526/87 |
| 4,524,193 | 6/1985 | Yamazaki et al. | 526/79 |
| 4,873,142 | 10/1989 | Hartwig | 428/359 |
| 5,356,985 | 10/1994 | Sackmann et al. | 524/460 |
| 5,492,758 | 2/1996 | Baggett et al. | 428/362 |
| 5,496,510 | 3/1996 | Capone | 264/182 |
| 5,506,042 | 4/1996 | Ichibori et al. | 428/224 |
| 5,618,901 | 4/1997 | Smierciak et al. | 526/342 |

FOREIGN PATENT DOCUMENTS

| | | | |
|---|---|---|---|
| 68-28533 | of 0000 | Japan . | |
| 71-102145 | of 0000 | Japan . | |
| 52-19792 | 2/1977 | Japan | 526/342 |
| 7010744 | 1/1971 | Netherlands | 526/342 |
| 696066 | 8/1953 | United Kingdom | 526/342 |
| 849029 | 9/1960 | United Kingdom | 526/342 |

OTHER PUBLICATIONS

Bruce G. Frushour, "Melting Behaviour of Polyacrylonitrile Copolymers" in *Polymer Bulletin*, 11, 375–382 (1984).

L. Patron and U. Bastianelli, *Appl. Polym. Symp.*, No. 25, 105 (1974).

J. Kim, C. Park, Y. Park, B. Min. T. Son, and J. Ryu, *J. of the Korean Fiber Soc.*, 34, 49 (1997).

NFPA 701 (1989).

UL 214 (1997).

*Primary Examiner*—Fred Zitomer
*Attorney, Agent, or Firm*—Howrey Simon Arnold & White

[57] ABSTRACT

The present invention relates to a modacrylic copolymer composition comprising acrylonitrile, vinylidene chloride, vinyl acetate, and at least one ionic comonomer. In one embodiment, the modacrylic copolymer composition comprises from about 45 to about 60% acrylonitrile, from about 35 to about 50% vinylidene chloride, from about 0.5 to about 5% vinyl acetate, and up to about 2% of a salt of p-sulfophenyl methallyl ether by weight of the total composition. The copolymer composition of the present invention provides acceptable color while having acceptable flame resistance.

22 Claims, No Drawings

MODACRYLIC COPOLYMER COMPOSITION

FIELD OF THE INVENTION

This invention relates to a modacrylic copolymer composition and a method of making a modacrylic copolymer composition. This invention also relates to the conversion of a modacrylic copolymer composition to fiber and/or carpet with acceptable fire ignition characteristics.

BACKGROUND OF THE INVENTION

A wide variety of polyacrylonitrile fibers have been spun that possess certain desirable physical properties such as high strength, high wet melting point, and good resistance to shrinkage at elevated temperatures. These properties of polyacrylonitrile fibers facilitate their use in many commercial and textile applications. However, the use of polyacrylonitrile fibers was limited because these fibers did not possess sufficient flame retardant properties.

In an effort to increase flame retardant properties of acrylonitrile fibers, acrylonitrile has been copolymerized with certain monomers such as vinyl chloride and vinylidene chloride. The degree of improvement in this property varies with the type and amount of modifier copolymerized with the acrylonitrile. However, it was difficult to provide acrylonitrile fibers with such a modifier that provides adequate flame retardant properties while also providing acceptable fiber properties such as acceptable color, high resistance to shrinkage, high strength, high wet melting point, and acceptable dyeability. These difficulties are encountered, in part, due to the difficulty of solubilizing vinyl chloride or vinylidene chloride.

Various acrylonitrile copolymer blends were developed that included acrylonitrile and vinylidene chloride. For example, U.S. Pat. No. 2,769,793, which is incorporated by reference herein, describes an acrylonitrile copolymer blend, containing 85 percent or greater acrylonitrile polymer, that may include a variety of monomeric components such as vinyl chloride, vinyl acetate, vinylidene chloride and the like. The blend may also contain a dye-receptive monomer. U.S. Pat. No. 3,828,014, which is incorporated by reference herein, relates to fibers formed from a copolymer of acrylonitrile and one or more copolymerizable monoolefinically unsaturated monomers. However, these patents describe acrylonitrile blends that do not provide adequate fiber properties, fiber processability, fire ignition resistance, and dyeability at the same time.

The fiber industry strives to provide fibers that not only possessed flame retardant properties, but also provide improved fiber lightfastness, fiber dyeability and fiber color. U.S. Pat. No. 3,824,222, which is incorporated by reference herein, describes a flameproof acrylic fiber that contains acrylonitrile, vinylidene chloride and vinyl phosphonate. U.S. Pat. No. 3,974,130, which is incorporated by reference herein, relates to a non-flammable acrylonitrile-vinylidene chloride copolymer fiber that includes comonomers that have a special affinity for dyes. However, these fiber compositions, designated as modacrylic, contain large quantities of vinylidene chloride (i.e., in concentrations above 25% by weight). Prior art compositions with vinylidene chloride suffered from poor fiber characteristics and bad color. For fiber forming purposes, vinylidene chloride in quantities necessary to impart flame resistance can impart several undesirable properties to the fibers.

Satisfactory prior art copolymers were not obtainable when the vinylidene chloride content exceeds 25% by weight of the copolymer composition due to poor flame retardancy or poor base copolymer whiteness. Vinylidene chloride also adversely affects the lightfastness of the fiber as well as other properties such as UV resistance. Such large concentrations of vinylidene chloride in the prior art copolymers increase processing complications due to the low solubility of vinylidene chloride, and result in fibers that possess unacceptable properties such as insufficient fiber structure (e.g., tensile properties), lightfastness and dyeability.

One satisfactory modacrylic blend manufactured commercially was a combination of vinyl bromide and vinylidene chloride with other comonomers. One such blend contained 61.45 percent acrylonitrile, 1.5 percent sodium p-sulfophenyl methallyl ether, 12.5 percent vinyl bromide, 23.9 percent vinylidene chloride, and 0.65 percent styrene. This copolymer composition has the Chemical Abstracts number CAS #31532-91-9, which is an acrylonitrile-vinyl bromide-vinylidene chloride copolymer.

However, the availability of vinyl bromide has recently declined.

Accordingly, there is a need for modacrylic fiber compositions that provide fibers with the combined properties of desirable fiber structure, lightfastness, color and flame retardancy.

Moreover, there is a need in various other industries for fire retardant polymeric materials that may be formed into various products without encountering color complications inherent with prior monomer and copolymer compositions.

SUMMARY OF THE INVENTION

The present invention relates to a modacrylic copolymer composition comprising acrylonitrile, vinylidene chloride, vinyl acetate, and at least one ionic comonomer. The modacrylic copolymer composition comprises from about 45 to about 60% acrylonitrile, from about 35 to about 50% vinylidene chloride, from about 0.5 to about 5% vinyl acetate, and from 0 to about 2% of a salt of p-sulfophenyl methallyl ether, by weight of the total composition.

The copolymer composition of the present invention provides acceptable fiber properties of strength and color while having acceptable fire ignition and char resistance. The pressed polymer color as defined in the examples of the blend is from about −7 to about −11, about equal to the previously described prior art vinyl bromide commercial blend CAS #31532-91-9.

The copolymer composition of the present invention may be utilized in various forms including shaped articles and formed into molecularly oriented fibers, threads, bristles, mono-filaments, and the like, and formed into other forms such as films, composites, laminates, powders, particles, pellets, solutions, dispersions, gels, pastes and the like.

DETAILED DESCRIPTION OF THE INVENTION

As used herein, the term modacrylic is a copolymer comprising greater than about 45% but less than 85% by weight acrylonitrile comonomer incorporated therein.

The present invention relates to a modacrylic copolymer composition comprising acrylonitrile, vinylidene chloride, vinyl acetate, and at least one ionic comonomer. The modacrylic copolymer composition comprises from about 45 to about 60 percent acrylonitrile, from about 35 to about 50 percent vinylidene chloride, from about 0.5 to about 5 percent vinyl acetate, and up to about 2 percent of a salt of an ionic comonomer, preferably sodium p-sulfophenyl methallyl ether, by weight of the total composition. Generally a small amount of an ionic comonomer, at least about 0.1 weight percent, is advantageous for purposes of dyeability and to help attain a denser fiber structure.

A preferred composition comprises from about 49 to about 59 percent acrylonitrile, from about 39 to about 49 percent vinylidene chloride, from about 0.5 to about 2.5 percent vinyl acetate, and between about 0.1 and about 1.5 percent of a salt of p-sulfophenyl methallyl ether by weight of the total composition. The preferred salt of p-sulfophenyl methallyl ether, an ionic comonomer, is the sodium salt.

Another preferred composition may contain about 50 to about 57 percent acrylonitrile, about 41 to about 48 percent vinylidene chloride, about 0.5 to about 1.5 percent vinyl acetate, and about 0.5 to about 1.5 of a salt of p-sulfophenyl methallyl ether by weight of the total composition.

Yet another preferred composition may contain about 49 to about 53 percent acrylonitrile, about 45 to about 49 percent vinylidene chloride, about 0.8 to about 1.2 percent vinyl acetate, and about 0.8 to about 1.2 of a salt of p-sulfophenyl methallyl ether by weight of the total composition.

One example of a preferred composition would be acrylonitrile at 52.9 percent, sodium p-sulfophenyl methallyl ether at 1.0 percent, vinylidene chloride at 45.1 percent, and vinyl acetate at 1.0 percent, plus or minus about 0.1 percent, by weight for each component.

Another example of a preferred composition may contain acrylonitrile at 50.2. percent, sodium p-sulfophenyl methallyl ether at 1.0 percent, vinylidene chloride at 47.8 percent, and vinyl acetate at 1.0 percent, plus or minus about 0.1 percent, by weight for each component.

This disclosure concerns the discovery of a new modacrylic copolymer composition containing vinyl acetate. Many of the embodiments that fall within the claims exhibit a pressed polymer color number of −10%. This value is a result of a standard test as defined in the examples that reflects the amount of undesirable red in a copolymer. The test result of −10% is as good as the pressed polymer color of the prior art blend called CAS #31532-91-9, previously described. Pressed polymer color values of between about −7% and about −15%, more preferably between about −7% to −12%, are expected to be achievable with copolymer compositions of the present invention.

The pressed polymer color test result of −10% achieved with a composition of the present invention is better than the pressed polymer color of the prior art commercially available copolymer that contained 59.5 percent acrylonitrile, 1 percent sodium p-sulfophenyl methallyl ether, 39 percent vinylidene chloride, and 0.5 percent styrene (hereinafter called CAS #9010-76-8, an acrylonitrile-vinylidene chloride copolymer).

The chemical structure of the copolymer may be depicted as follows:

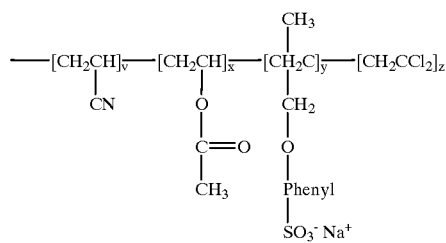

Where the acrylonitrile, CAS number 107-13-1, the vinyl acetate, CAS number 108-05-4, the sodium p-sulfophenyl methallyl ether, CAS number 1208-67-9, and the vinylidene chloride, CAS number 75-34-4, are present at weight fractions given by v, x, y, and z, respectively.

The neutral modifying vinyl comonomers of the present invention, particularly vinyl acetate, allow the improvement in base copolymer whiteness composition over prior art compositions with greater than 25% vinylidene chloride while maintaining flame resistance and other desirable properties.

The use of 1% vinyl acetate in the modacrylic also reduces the levels of activator and initiator needed in the redox polymerization by as much as 30%. Reduced activator and initiator levels help to produce reduced chromophoric defects in polyacrylonitrile. See L. Patron and U. Bastianelli, Appl. Polym. Symp., No. 25, 105 (1974) and J. Kim, C. Park, Y. Park, B Min, T Son, and J. Ryu, J. of the Korean Fiber Soc., 34, 49 (1997). However, significant differences in chromophoric functionality due to ketene-imine were not seen as per the specified infrared absorbences in the literature.

Moreover, fabrics that are made from fiber from the copolymer compositions of this invention pass the flame resistance test procedures as set out by the National Fire Protection Association, also called NFPA 701 Small Scale Test for Flame-Resistant Textiles and Films, 1989 Edition. Fabrics that are made from fiber from the copolymer compositions of this invention also pass the flame resistance test procedures as set out by the Underwriters Laboratories Inc. Standard 214 Small-Flame Test for Flame-Propagation of Fabrics and Films, 1997 Edition.

As used herein, the term "flame resistant fabrics" means fabrics that pass a preponderance, i.e., greater than 80%, of the NFPA 701 (1989) and/or Underwriters Laboratories Inc. Standard 214 flame resistance tests (1997) performed.

Fabrics that are made from fiber from the modacrylic copolymer of this invention pass the NFPA 701 (1989) and UL 214 (1997) small scale fire resistance tests. The whiteness of the modacrylic copolymer of this invention as measured by pressed polymer color tests is superior to compositions without vinyl acetate. Finally, as much as 30% less activator and initiator is required for redox polymerization when 1% vinyl acetate is incorporated into the modacrylic copolymer compared to redox polymerization when no vinyl acetate is incorporated into the modacrylic copolymer.

Other ionic comonomers, in addition to sodium p-sulfophenyl methallyl ether, may make acceptable fibers. As used herein, a "ionic comonomer" is an ionic comonomer which adds one or more ionic functional groups to the copolymer composition. Ionic functional groups can act as dye sites. Typical ionic functional groups include sulfonate, carboxylate, and sulfate moieties. The ionic comonomer provides the resulting composition with desirable basic dye dyeability and copolymer structure that improves subsequent processing of the copolymer, such as in fiber spinning. Sulfonate-containing ionic comonomers, also called "sulfonate ionic comonomers", are preferred.

Sulfonate ionic comonomers according to the present invention may be represented by a vinyl monomer with a sulfonate salt or sulfonic acid of the Formula (II):

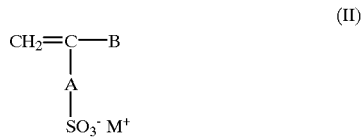

wherein A is an aromatic or aliphatic substituent preferably having from about 1–9 carbon atoms, typically a methyl group; B is either hydrogen or an aliphatic substituent preferably having from about 1–9 carbon atoms on the vinyl monomer; and M+ represents a suitable counterion to the sulfonate group, for example an alkali metal cation, an alkaline earth metal cation, ammonium, or hydronium cation. The aliphatic and aromatic groups may be unsubstituted or they may be substituted with various constituents such as halogen atoms, organic groups and the like. Preferably, the aliphatic group is a methyl group. Preferably, the aromatic group is a phenyl group or phenyl ether group.

Suitable sulfonate ionic comonomers include salts or the sulfonic acids of allyl sulfonate, methallyl sulfonate, styrene sulfonate, p-sulfophenyl methallyl ether, 2-methyl-2-acrylamidopropane sulfonate, acrylamido tertiary butyl sulfonic acid, or mixtures thereof. The counterion is usually sodium, though other alkali metals, the hydronium ion and ammonium are suitable. As used herein, the term "salts" of ionic comonomers includes the acid form. Mixtures of two or more of the ionic comonomers are also suitable.

The copolymer of the present invention may be prepared by any polymerization processes, e.g. emulsion polymerization in an aqueous medium or an aqueous dispersion polymerization process. An anionic surface active agent may be employed in combination with a small amount of a usual non-ionic surface active agent. Examples of the anionic surface active agent are, for instance, fatty acid salts, sulfates, sulfonates and phosphates. In the case of a solution polymerization process, solvents having a relatively small chain transfer constant are preferably employed, e.g. ethylene carbonate, dimethylsulfoxide, N,N-dimethylacetamide or N,N-dimethylformamide are particularly preferred. These solvents used as a polymerization medium may contain a small amount of water or other organic solvents, unless the uniform solubility of the copolymer and the polymerizability are prevented.

Usual radical polymerization initiators are employed as catalysts for polymerization. Examples of the polymerization initiators are, for instance, persulfates such as ammonium persulfate, sodium persulfate, or potassium persulfate, combinations of a persulfate with a bisulfite such as sodium or ammonium bisulfite, azo compounds such as 2,2'-azobis (2,4-dimethylvaleronitrile) and 2,2'-azobisisobutyronitrile, peroxides such as di (2-ethylhexyl) peroxydicarbonate, t-butyl peroxypivalate and lauroyl peroxide, and combinations of peroxides such as hydrogen peroxide with organic reducing agents such as L-ascorbic acid. They are suitably selected according to the polymerization process.

In an embodiment of the present invention, an acrylic fiber copolymer precursor is produced by a continuous free radical redox aqueous dispersion polymerization process, in which water is the continuous phase and the initiator is water soluble. The redox system consists of persulfate (the oxidizing agent and initiator, sometimes called "catalyst"), sulfur dioxide or a bisulfite (reducing agent, sometimes called "activator") and iron (the true redox catalyst). Salts of the initiator and activator may be used. Typical salts include ammonium, sodium, or potassium.

Advantageously, similar results are obtained with up to 30 percent less initiator and activator when 1 weight percent vinyl acetate is incorporated, compared to the quantities required for essentially identical compositions but without the vinyl acetate. For example, as little as 0.3 to 0.4 weight percent, based on the monomer, of sodium persulfate initiator and as little as 0.6 to about 0.8 weight percent, based on the monomer, of ammonium bisulfite activator was required to achieve about 75% conversion of monomer into copolymer. This corresponds to about 0.12 to about 0.17 moles of initiator and about 0.6 to about 0.8 moles of activator per kilogram of monomer for the given reaction conditions, i.e., the iron concentration, water content, temperature, and residence time as shown in Examples 10 and 11.

A persulfate initiator, a peroxide initiator, or an azo initiator may be utilized to generate free radicals for the vinyl polymerization rather than the above-mentioned redox system.

Usual wet and dry spinning processes are adoptable for the preparation of a fiber from the copolymer of the present invention, and a wet spinning process is particularly preferable. Usual solvents for acrylonitrile polymers may be employed as solvents for preparing a spinning solution, e.g. acetonitrile, acetone, N,N-dimethylacetamide, N,N-dimethylformamide and dimethylsulfoxide. Since the copolymer is uniformly dissolved, N,N-dimethylformamide, N,N-dimethylacetamide and dimethylsulfoxide, particularly N,N-dimethylacetamide, are preferred. The spinning solution or the reaction mixture obtained by a solution polymerization and used as a spinning solution may, as occasion demands, contain additives, e.g. a stabilizer such as pigments, an organozinc compound or an organic reducing agent, an agent for improving the hand touchness such as a titanium compound or an aluminum compound, a flame retardant such as an antimony compound, a tin compound, or a bromine compound. The concentration of the copolymer in the spinning solution may be selected from 15 to 40% by weight. The wet spinning is carried out usually by extruding the spinning solution into a 10 to 80% by weight aqueous solution of a solvent to form a filament, drawing the filament, washing with water and drying. If necessary the obtained filament may be further drawn and heat-treated.

In an embodiment of the present invention, the modacrylic fiber copolymer precursors thus obtained may be used to form modacrylic fibers by various methods, including dry and wet spinning such as those set forth in U.S. Pat. Nos. 3,088,188; 3,193,603; 3,253,880; 3,402,235; 3,426, 104; 3,507,823; 3,867,499; 3,932,577; 4,067,948; 4,294, 884; 4,447,384; 4,873,142; and 5,496,510, each of which is incorporated herein by reference.

The physical properties of the modacrylic copolymer composition of the present invention enable the composition to be utilized in a variety of applications. For example, the copolymer is soluble in a variety of solvents including polar aprotic solvents such as N,N-dimethylacetamide, N,N-dimethylformamide, dimethylsulfoxide and the like; and in aqueous solutions such as zinc chloride (65%), sodium thiocyanate (55%), and the like.

The modacrylic copolymer composition of the present invention possesses other desirable physical properties including blendability with other fibers, including acrylics and modacrylics.

In one embodiment of the present invention, the copolymer composition is formed into fibers by a wet spinning process in a spin bath. Spinning processes are known to the art; see, for example, U.S. Pat. Nos. 4,067,948 and 3,867,499, the disclosures of which are incorporated herein by reference. The solvent in the spin bath is normally the same solvent in which the copolymer is dissolved prior to spinning. Water may also be included in the spin bath and generally that portion of the spin bath will comprise the remainder. Suitable organic spinning solvents for the present invention include N,N-dimethylacetamide, N,N-dimethylformamide, dimethylsulfoxide, and ethylene carbonate. Suitable inorganic solvents include aqueous sodium thiocyanate. Preferably, the solvent utilized in the spinning process of the present invention is N,N-dimethylacetamide.

The spun filaments may be subjected to jet stretch. Jet stretch, which is the speed of the first stretching roll set contacted by the filaments on exiting the spinnerette divided by the velocity of the copolymer solution through the spinnerette, is controlled between 0.2 and 1.0, preferably 0.4 to 0.6. At lower jet stretch, processing difficulties are encountered and at higher jet stretch, void sizes tend to increase.

Subsequently, the filaments may be subjected to wet stretch. Wet stretch from about 2× to about 8× is provided by feeding the filaments into a second higher speed roll set and stretching the wet filaments. The temperature employed in the wet stretch process may range between about the glass transition temperature to less than the wet melting temperature of the copolymer.

It is desirable that the wet melt temperature of the copolymer be greater than about 120° C., preferably greater than about 130° C., to facilitate subsequent treatments, i.e., steam annealing. The wet melt temperature is measured by differential scanning calorimetry, wherein the polymer and water are placed in a pressure vessel and the endotherm is measured over a temperature range. The change in the specific heat indicates the wet melt temperature. This is a known and standard test in the art, and is described fully in Bruce G. Frushour, "Melting Behavior of Polyacrylonitrile Copolymers" in *Polymer Bulletin*, 11, 375–382 (1984).

The fibers produced by the above described process may be treated by "in-line relaxation" or batch annealing prior to final use. In-line relaxation is achieved by feeding the filaments into a hot water bath, steam or heated solvent and water bath, usually at a temperature of 80° C. to boiling and withdrawing the filaments at a slower speed to compensate for shrinkage which takes place in the bath. The relaxed filaments are dried by conventional heated rolls or heated air and are suited for use as is or after being converted to staple without the need for a batch annealing process.

The fibers formed from the copolymer of the present invention possess combined desirable physical properties over other copolymer fibers including improved fiber structure, flame retardancy, whiteness, dyeability, lightfastness, wet melting point and the like.

The copolymer composition of the present invention may be utilized in various forms including shaped articles and formed into molecularly oriented fibers, i.e., threads, bristles, mono-filaments, and the like. The copolymer may also be formed into other forms such as films, composites, laminates, powders, particles, pellets, solutions, dispersions, gels, pastes and the like, either in a pure form or admixed with other additives.

The copolymer compositions and fibers of the present invention are further defined by reference to the following illustrative examples.

EXAMPLES 1 to 5

Modacrylic polymers of the present invention, Examples 3 and 4, were prepared. For comparative purposes, a commercially available modacrylic containing acrylonitrile (AN), vinylidene chloride ($VCl_2$) and styrene, was also used. These are comparative Examples 1 and 5. Also for comparative purposes, a modacrylic without vinyl acetate (VA) or styrene, Example 2, was prepared. The compositions of the modacrylic polymers are shown in Table 1.

TABLE 1

| Composition of Copolymers in Examples 1–5 | | | | | |
|---|---|---|---|---|---|
| Example | % AN | % VA | % SPME | % $VCl_2$ | % Styrene |
| 1 | 59.50 | — | 1.00 | 39.00 | 0.50 |
| 2 | 58.00 | — | 1.00 | 41.00 | — |
| 3 | 50.16 | 1.00 | 1.00 | 47.84 | — |
| 4 | 52.89 | 1.00 | 1.00 | 45.11 | — |
| 5 | 59.50 | — | 1.00 | 39.00 | 0.50 |

The polymers were formed into fiber products, then into forest green fabric, and these fabrics were then tested following the industry standard NFPA 701 (1989) and UL 214 (1997) small scale fire resistance tests in fabrics. The process of forming the modacrylic copolymer into fiber, and forming the fiber into fabric, are well known to the art. The fire resistance data obtained was: Example 1 had an average burn of 5.1 inches, and failed the test; Example 2 had an average burn of 4.5 inches, and failed the test: Example 3 had an average burn of 3.6 inches, and passed the test: Example 4 had an average burn of 3.65 inches, and passed the test; and Example 5 had an average burn of 3.9 inches, and passed the test.

The comparative example without a neutral modifying comonomer, Example 2, failed the test. Examples that contained styrene, Examples 1 and 5, had mixed results. Fabrics made from the composition of the present invention, Examples 3 and 4, passed the flame resistance test.

EXAMPLES 6 to 9

Modacrylic polymers of the present invention, Examples 6 and 7, were prepared. For comparative purposes, a commercially available modacrylic containing vinylidene chloride and styrene, Example 8, and a modacrylic with vinylidene chloride and vinyl bromide, Example 9, were used. The compositions of the copolymers are shown in Table 2.

The last column provides pressed polymer color (PPC) test data. The pressed polymer color test results for Examples 6 and 7, −9.82% and −10.32% respectively, is a better result than the −10.43% achieved with the acrylonitrile-vinyl bromide-vinylidene chloride copolymer (CAS #31532-91-9) composition in comparative Example 9.

The test result for comparative Example 8 was −19.23%. This is a significantly inferior color compared to the color of the other samples tested.

TABLE 2

Composition of Copolymers in Examples 6–9

| Example | % AN | % VBr | % VA | % SPME | % VCl$_2$ | % Styrene | % PPC |
|---|---|---|---|---|---|---|---|
| 6 | 52.89 | — | 1.00 | 1.00 | 45.11 | — | −9.82 |
| 7 | 50.16 | — | 1.00 | 1.00 | 47.84 | — | −10.32 |
| 8 | 59.50 | — | — | 1.00 | 39.00 | 0.50 | −19.23 |
| 9 | 61.45 | 12.50 | — | 1.50 | 23.90 | 0.65 | −10.43 |

The pressed polymer color is a standard test, known in the art, that comprises the following steps. A known weight of copolymer was placed in a die and then compressed into a disk at 40,000 psi for 30 seconds. The color of the disc is then measured. Pressed polymer color is the measurement as a polymer pressed pellet of the % reflectance @ 420 nm minus the % reflectance @ 600 nm in a BYK-Gardner Colorsphere. The more negative the pressed polymer color number, the more undesirable yellow-red is the color of the polymer.

EXAMPLE 10

An example of a continuous aqueous dispersion process with an ammonium counterion redox was prepared as follows. A 7.0 liter continuously stirred (with two 6-blade 45 degree impellers rotating at 600 rpm) tank reactor was held at a temperature of about 35 degrees Centigrade. A number of feed streams were introduced into the reactor at rates such that the average reactor residence time was 150 minutes. The pH was kept near 3.5. The composition of the total feed is shown in Table 3.

Polymerization was initiated by feeding aqueous solutions of ammonium persulfate (the oxidizing agent and initiator, sometimes called "catalyst"), ammonium bisulfite (the reducing agent, sometimes called "activator") and ferrous or ferric iron (the true redox catalyst), and sulfuric acid (for pH control). These conditions resulted in 74.9% by weight conversion of monomer to copolymer. The final copolymer composition was 47.91% vinylidene chloride, 1.03% sodium p-sulfophenyl methallyl ether, 0.98% vinyl acetate and the balance acrylonitrile. It is recognized that the salt of p-sulfophenyl methallyl ether may be another cation, i.e., ammonium, but it is reported as the sodium salt for clarity. The pressed polymer color for the copolymer was −9.57%.

TABLE 3

Composition of Feed to the Continuous Stirred Tank Reactor, Example 10

| Compound | Quantity | Units |
|---|---|---|
| Acrylonitrile monomer | 49.6 | parts by weight |
| Vinylidene chloride monomer | 48.6 | parts by weight |
| Vinyl acetate monomer | 0.9 | parts by weight |
| Sodium p-sulfophenyl methallyl ether monomer | 0.9 | parts by weight |
| Water | 200.0 | parts by weight |
| Ammonium persulfate (initiator) | 0.33 | % based on monomer |
| Ammonium bisulfite as sulfur dioxide (activator) | 0.66 | % based on monomer |
| Iron (Ferrous or Ferric) | 1.6 | ppm based on monomer |
| Sulfuric acid | trace | |

EXAMPLE 11

An example of a continuous aqueous dispersion process with a sodium counterion redox follows. A 7.0 liter continuously stirred (with two 6-blade 45 degree impellers rotating at 500 rpm) tank reactor was held at a temperature of about 35 degrees Centigrade. A number of feed streams were introduced into the reactor at rates such that the average residence time was 150 minutes. The pH was kept near 3.4. The composition of the feed is shown in Table 4.

Polymerization was initiated by feeding aqueous solutions of sodium persulfate (the oxidizing agent and initiator, sometimes called "catalyst"), sodium bisulfite (the reducing agent, sometimes called "activator") and ferrous or ferric iron (the true redox catalyst), and sulfuric acid (for pH control). These conditions resulted in 76.9% by weight conversion of monomer to copolymer. The final copolymer composition was 46.88% vinylidene chloride, 1.06% sodium p-sulfophenyl methallyl ether, 1.14% vinyl acetate, and the balance acrylonitrile. The pressed polymer color of the copolymer was −9.21%.

TABLE 4

Composition of Feed to the Continuous Stirred Tank Reactor, Example 11

| Compound | Quantity | Units |
|---|---|---|
| Acrylonitrile monomer | 51.6 | parts |
| Vinylidene chloride monomer | 46.5 | parts |
| Vinyl acetate monomer | 1.0 | parts |
| Sodium p-sulfophenyl methallyl ether monomer | 0.9 | parts |
| Water | 200.0 | parts |
| Sodium persulfate (initiator) | 0.36 | % based on monomer |
| Sodium bisulfite as sulfur dioxide (activator) | 0.72 | % based on monomer |
| Iron (Ferrous or Ferric) | 1.6 | ppm based on monomer |
| Sulfuric acid | trace | |
| Sodium bicarbonate | trace | |

The preceding description of specific embodiments of the present invention is not intended to be a complete list of every possible embodiment of the invention. Persons skilled in this field will recognize that modifications can be made to the specific embodiments described here that would be within the scope of the present invention.

What is claimed is:

1. A modacrylic copolymer comprising:
   (a) between about 49 and about 59 weight percent acrylonitrile;
   (b) between about 39 and about 49 weight percent vinylidene chloride;
   (c) between about 0.5 and about 5 weight percent vinyl acetate; and
   (d) between about 0.1 and about 2 weight percent of an ionic comonomer.

2. The copolymer of claim 1, wherein the copolymer comprises between about 50 and about 57 weight percent acrylonitrile, between about 41 and about 48 weight percent vinylidene chloride, between about 0.5 and about 1.5 weight percent vinyl acetate, and between about 0.5 and about 1.5 weight percent of an ionic comonomer.

3. The copolymer of claim 1, wherein the copolymer comprises between about 49 and about 53 weight percent acrylonitrile, between about 45 and about 49 weight percent vinylidene chloride, between about 0.8 and about 1.2 weight percent vinyl acetate, and between about 0.8 and about 1.2 weight percent of an ionic comonomer.

4. The copolymer of claim 1, wherein the copolymer comprises between about 52.8 and about 53 weight percent acrylonitrile, between about 45 and about 45.2 weight percent vinylidene chloride, between about 0.9 and about 1.1 weight percent vinyl acetate, and between about 0.9 and about 1.1 weight percent of an ionic comonomer.

5. The copolymer of claim 1, wherein the copolymer comprises between about 50.1 and about 50.3 weight percent acrylonitrile, between about 47.7 and about 47.9 weight percent vinylidene chloride, between about 0.9 and about 1.1 weight percent vinyl acetate, and between about 0.9 and about 1.1 weight percent of an ionic comonomer.

6. The copolymer of claim 1 wherein the ionic comonomer comprise p-sulfophenyl methallyl ether or salts of allyl sulfonate, methallyl sulfonate, styrene sulfonate, p-sulfophenyl methallyl ether, 2-methyl-2-acrylamidopropane sulfonate, acrylamido tertiary butyl sulfonic acid, or mixtures thereof.

7. The copolymer of claim 1 wherein the copolymer is in the form of films, composites, laminates, powders, particles, pellets, solutions, dispersions, gels, or pastes.

8. The copolymer of claim 1, wherein the copolymer has a wet melt temperature greater than about 130° C.

9. A modacrylic copolymer comprising:
   (a) between about 45 and about 60 weight percent acrylonitrile;
   (b) between about 35 and about 50 weight percent vinylidene chloride;
   (c) between about 0.5 and about 5 weight percent vinyl acetate; and
   (d) between about 0 and about 2 weight percent of a salt of p-sulfophenyl methallyl ether.

10. The copolymer of claim 9, wherein the copolymer comprises between about 49 and about 59 weight percent acrylonitrile, between about 39 and about 49 percent vinylidene chloride, between about 0.5 and about 2.5 weight percent vinyl acetate, and between about 0.1 and about 2 weight percent of a salt of p-sulfophenyl methallyl ether.

11. The copolymer of claim 9, wherein the copolymer comprises between about 50 and about 57 weight percent acrylonitrile, between about 41 and about 48 weight percent vinylidene chloride, between about 0.5 and about 1.5 weight percent vinyl acetate, and between about 0.5 and about 1.5 weight percent of a salt of p-sulfophenyl methallyl ether.

12. The copolymer of claim 9, wherein the copolymer comprises between about 49 and about 53 weight percent acrylonitrile, between about 45 and about 49 weight percent vinylidene chloride, between about 0.8 and about 1.2 weight percent vinyl acetate, and between about 0.8 and about 1.2 weight percent of a salt of p-sulfophenyl methallyl ether.

13. The copolymer of claim 9, wherein the copolymer comprises between about 52.8 and about 53 weight percent acrylonitrile, between about 45 and about 45.2 weight percent vinylidene chloride, between about 0.9 and about 1.1 weight percent vinyl acetate, and between about 0.9 and about 1.1 weight percent of a salt of p-sulfophenyl methallyl ether.

14. The copolymer of claim 9, wherein the copolymer comprises between about 50.1 and about 50.3 weight percent acrylonitrile, between about 47.7 and about 47.9 weight percent vinylidene chloride, between about 0.9 and about 1.1 weight percent vinyl acetate, and between about 0.9 and about 1.1 weight percent of a salt of p-sulfophenyl methallyl ether.

15. The copolymer of claim 9, wherein the copolymer has a pressed polymer color number from about −7% to about −15%.

16. The copolymer of claim 9, wherein the copolymer has a pressed polymer color number from about −7% to about −12%.

17. The copolymer of claim 9, wherein the copolymer has a wet melt temperature greater than about 120° C.

18. Fiber comprising a modacrylic copolymer, wherein the modacrylic copolymer comprises:
   (a) between about 49 and about 59 weight percent acrylonitrile;
   (b) between about 39 and about 49 weight percent vinylidene chloride;
   (c) between about 0.5 and about 5 weight percent vinyl acetate; and
   (d) between about 0.1 and about 2 weight percent of an ionic comonomer.

19. The fiber of claim 18 wherein the modacrylic copolymer comprises between about 49 and about 53 weight percent acrylonitrile, between about 45 and about 49 weight percent vinylidene chloride, between about 0.8 and about 1.2 weight percent vinyl acetate, and between about 0.8 and about 1.2 weight percent of a salt of p-sulfophenyl methallyl ether.

20. The fiber of claim 18, wherein the fiber is in the form of fabric.

21. The fabric of claim 20 wherein the fabric is a blend of types of fibers.

22. The fabric of claim 20 wherein the fabric is flame resistant fabric.

* * * * *